United States Patent [19]

Lunieski et al.

[11] Patent Number: 5,151,141
[45] Date of Patent: Sep. 29, 1992

[54] TIRE AND RIM

[75] Inventors: Chester E. Lunieski, Kent; Grover W. Rye, Cuyahoga Falls, both of Ohio

[73] Assignee: The Goodyear Tire & Rubber Company, Akron, Ohio

[21] Appl. No.: 676,496

[22] Filed: Mar. 28, 1991

[51] Int. Cl.⁵ ..................... B60C 15/024; B60C 13/00
[52] U.S. Cl. ................................. 152/544; 152/555; 152/397.5
[58] Field of Search ............... 152/539, 544, 549, 555, 152/516, 517, 522, 379.3, 379.5, 382, 383

[56] References Cited

U.S. PATENT DOCUMENTS

| | | |
|---|---|---|
| 501,290 | 7/1893 | Moomy . |
| 508,996 | 11/1893 | Stubbs . |
| 512,243 | 1/1894 | Chinnock . |
| 512,491 | 1/1894 | Smith . |
| 514,412 | 2/1894 | Callaghan . |
| 521,482 | 6/1894 | Smallman . |
| 532,950 | 1/1895 | Erickson . |
| 560,660 | 5/1896 | Tomlinson . |
| 600,187 | 3/1898 | Warry . |
| 659,557 | 10/1900 | Smith . |
| 749,840 | 1/1904 | Butler . |
| 779,730 | 1/1905 | Neary . |
| 815,430 | 3/1906 | Jeffery ................................. 152/555 |
| 944,964 | 12/1909 | Haynes . |
| 1,202,919 | 10/1916 | Tew . |
| 1,281,601 | 10/1918 | Lewis . |
| 1,493,658 | 5/1924 | Wagenhorst . |
| 1,503,883 | 8/1924 | Cobb . |
| 3,253,636 | 5/1966 | Travers . |
| 3,253,639 | 5/1966 | Travers . |
| 3,292,681 | 12/1966 | Travers . |
| 3,712,362 | 1/1973 | Alderfer . |
| 3,841,375 | 10/1974 | Edwards ............................ 152/522 |
| 3,842,883 | 10/1974 | Masson et al. ....................... 152/555 |
| 3,877,503 | 4/1975 | Tangorra et al. . |
| 4,029,139 | 6/1977 | Abbott . |
| 4,077,455 | 3/1978 | Curtiss. Jr. et al. . |
| 4,096,899 | 6/1978 | Kitazawa et al. ................... 152/555 |
| 4,142,567 | 3/1979 | Johannsen et al. ................. 152/555 |
| 4,293,018 | 10/1981 | Dubois . |
| 4,967,822 | 11/1990 | Frerichs et al. . |

FOREIGN PATENT DOCUMENTS

| | | | |
|---|---|---|---|
| 0122731 | 7/1944 | Australia ............................ 152/544 |
| 2357240 | 7/1974 | Fed. Rep. of Germany . |
| 3318440 | 11/1984 | Fed. Rep. of Germany ...... 152/516 |
| 3416060 | 10/1985 | Fed. Rep. of Germany ...... 152/544 |
| 0542645 | 10/1957 | Italy .................................... 152/543 |
| 1351443 | of 1874 | United Kingdom . |
| 0183942 | 8/1922 | United Kingdom ................ 152/539 |
| 1491197 | 11/1977 | United Kingdom . |

OTHER PUBLICATIONS

Goodyear Radial Aircraft Tire-A New Product created in Luxembourg.
"After Shocks, Car of the Future", Popular Mechanics, Feb. 1988, pp. 66-69 & 134.

*Primary Examiner*—Michael W. Ball
*Assistant Examiner*—Nancy T. Krawczyk
*Attorney, Agent, or Firm*—David L. King

[57] ABSTRACT

An open-torus radial ply pneumatic tire is configured for mounting on a specially designed rim. The special rim includes means for restraining the radially outward movement of the tire's rim securing regions, which are spaced apart regions of the rim in which the tire's radial carcass plies are anchored. In the rim securing regions, the carcass plies are turned axially outwardly and encased in a molded elastomeric material having a shape complementary with that of the restraining means of the special rim. The tire also includes a belt structure positioned radially outwardly of the carcass plies.

11 Claims, 9 Drawing Sheets

TIRE AND RIM

BACKGROUND OF THE INVENTION

This invention relates to a radial-ply pneumatic tire of the open-torus type which is intended for use in combination with a specially designed rim.

The term "open-torus" refers to a tire, such as a conventional pneumatic tire, that has a toroidal shape that is open on its radially inner circumference. A conventional open-torus pneumatic tire has bead regions which are adapted to be mounted on a rim having axially opposed flanges that extend axially and radially outwardly. Typically, annular beads comprising metal wires or cables are used to restrain radially outwardly movement of the tire with respect to the rim upon which it is mounted. The flanges of a conventional rim do not restrain radially outward movement of the bead regions of a tire.

The modern radial-ply pneumatic tire is designed under standards promulgated by any number of individual organizations, including The Tire & Rim Association, Inc., The European Tyre & Rim Technical Organization, and The Japan Automobile Tire Manufacturers Association, et al. Under the standards promulgated by these organizations, which are quite similar, when a tire of a given size is being designed, it is designed for mounting on a "design rim", which is a rim having a specified configuration and width. "Design rim width" is the specific rim width assigned to each tire size and typically is equal to 70 percent of the specific tire's "section width". The section width is the width of the new tire, including 24-hour inflation growth and including normal sidewalls, but not including protective side ribs, bars, decorations or indicia. The "section height" of a tire is equal to the radial distance from the nominal rim diameter to the outside diameter of the tire at its equatorial plane.

The "aspect ratio" of a tire is the ratio of its section height to its section width. A "tire's design load" is the base or reference load assigned to a tire at a specific inflation pressure and service condition: and other load-pressure relationships applicable to the tire are based on that base or reference load. The terms "normal inflation pressure" and "normal load" as used herein refer respectively to the specific inflation pressure and load assigned by the appropriate standards organization for the design load as defined above for the service condition of the tire.

The conventional or modern radial-ply, open-torus pneumatic tire is now available in many configurations for many service conditions. It is generally recognized that the best overall performance is achieved with tire sidewalls in which the bead area adjacent the radially non-restraining flange is very rigid and gradually changes to a very flexible sidewall region before increased rigidity is encountered in the shoulder area of the tire, in which region the edges of the restrictive belt plies typically are located.

The tire structure described herein has flexible sidewalls without requiring stiffening elements adjacent the flanges. The flexibility of the sidewall enhances ride comfort yielding a soft feeling ride at inflation pressures equal or even higher than the typical modern radial tire.

Unlike conventional radial tires, the tire and rim combination of the invention described herein provides a means for retaining the beads in position on the rim in the event of a tire failure relating to deflation and loss air pressure. The sidewalls of the tire act as though hinged in proximity of the rim. The rim and tire design enables the rim to ride primarily over the deflated tire tread surface and provides a limited runflat capability. The flexible nature of sidewalls coupled with the rim permits avoidance of excessive abrasion. Conventional radial tires when run flat have the rim cutting into the sidewall, the bead unseating, and the road abrading the exterior surface of the sidewall. The invention claimed is an improvement over conventional radial tires.

While the tire structure disclosed herein departs significantly from commercially available conventional tires, through hindsight it may be seen to be reminiscent of tire development long since abandoned by the industry. Perhaps most significant of this abandoned prior art are those developments illustrated in British Patent No. 467 of C. H. Gray, dated 1913 and British Patent No. 29,639 to G. F. Fisher dated in the same year.

SUMMARY OF THE INVENTION

In accordance with the invention, a radial-ply pneumatic tire of the open-torus type is configured for mounting on a specially designed rim satisfying the definition previously given. For purposes of this invention the special rim is to be regarded as a rim having a width between its flanges (as more fully illustrated hereinafter) equal to 70 percent of the tire's section width. The special rim includes means for radially restraining a tire at the portion of the tire forming the circumferential opening on the radially inner side of its toroidal form. This circumferential opening is what gives the tire its open-torus characteristic. The purpose of the restraining means of the rim, which grips the exterior surfaces of the rim securing regions of a tire, is to restrict radially outward movement of the tire.

The radial-ply tire of the invention comprises one or more radial-cord carcass plies, a belt structure positioned radially outwardly of the carcass plies, and a tread positioned radially outwardly of the carcass plies and belt structure. The tread, of course, is oriented for rotation about the axis of the tire.

For purposes of the invention, a "radial cord" is to be regarded as a cord oriented at an angle with respect to and at the equatorial plane of the tire in the range from 65° to 90° inclusive. Also, the term "cord" includes both those tire cords which may now or hereafter be conventionally used in radial-ply pneumatic tires, whether the cords are formed from glass, steel, or organic materials, or are monofilament or multifilament structures. The term "ply" refers to a sheet or layer of parallel cords, embedded in an elastomeric material, and a "carcass ply" is a ply which extends between two axially-spaced-apart regions in which the plies are anchored. The rim securing regions typically are referred to as "bead regions" in conventional tires.

According to the invention, the radial cord carcass plies of the tire extend between the two axially-spaced rim securing regions. The carcass plies in the rim securing regions are folded axially and radially outwardly and are encased in an elastomeric material. The elastomeric material is molded in a shape complementary with that of the restraining means of the special rim, thereby, to permit the special rim restraining means to restrict radially outward movement of the rim securing regions of the tire which, when mounted on a special rim, are engaged from its exterior by the rim's restraining means.

The belt structure of the tire of the invention has, in one or more plies, cords that are oriented at both positive and negative angles with respect to the equatorial plane of the tire (cords parallel with the equatorial plane being regarded as cords oriented at an angle of 0°). The cord angles in the ply or plies of the belt structure are in the magnitude range from 17°-30° and, very importantly in the tire design, provide circumferential restriction of the inflated tire profile.

In accordance with a further aspect of the invention, a radial-ply pneumatic tire, when normally inflated on the special rim, has the most narrow of its belt plies having cords in the angle range of 17°-30° and crossing the equatorial plane less than or equal in width to the design rim width.

According to another aspect of the invention, the tire, when mounted on the special rim having normal inflation pressure and placed under a normal load, has a loaded cross-sectional profile in its ground contact region that exhibits, in relation to the unloaded cross-sectional profile, primary sidewall bending adjacent a rim securing region of the tire.

These and other aspects of the invention may be better understood by reference to the drawings and the description which follows.

DETAILED DESCRIPTION

Figure 1:
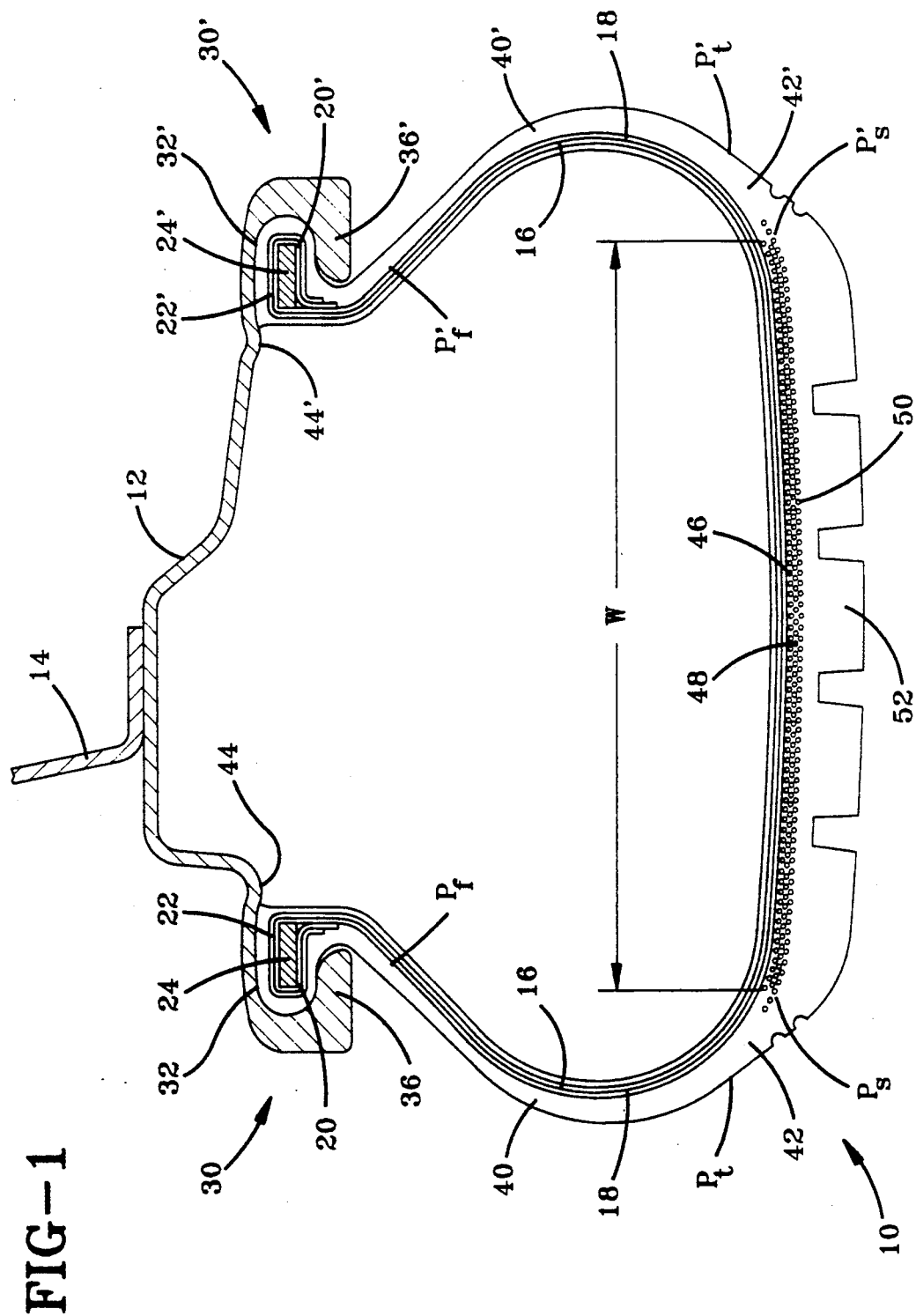
FIG. 1 is a radial cross-sectional view of a normally inflated unloaded radial-ply pneumatic tire constructed in accordance with the invention and is depicted mounted on a "special rim"

With particular reference now to FIG. 1, there is shown a cross-sectional view of a radial-ply tire, generally designated by the numeral 10, mounted on a special rim 12, coupled to a wheel disk, or spokes, 14 to permit the rim 12 to rotate about the axis of rotation of the tire (not shown). The cross-sectional view of the tire 10 is through a radial plane which contains such axis of rotation.

Whether within the drawings, the specification, or the claims, like numerals or letters refer to like parts or dimensions in the several views and primed numerals designate symmetrically similar parts. Such symmetry is about the equatorial plane M of the tire 10, the tire's axis of rotation being perpendicular to such plane. The angles of cords in the various carcass and belt plies of the tire, unless otherwise specifically stated, are measured at their intersections with the equatorial plane M. Cord angles parallel with the plane M are of 0° and those extending to the left as they go into the paper as viewed in FIG. 1 are negative, while those extending to the right as they go into the paper as viewed in FIG. 1 are to be regarded as positive angles. As used herein and in the appended claims, the term "radial cord" refers to a cord which, in a vulcanized tire is disposed at an angle in the range from ±65° to 90° inclusive with respect to the equatorial plane M. Also, "radial planes" are those which contain the axis of rotation of the tire, and the terms "axially inwardly" and "axially outwardly" refer to directions that are parallel to the axis of rotation of the tire and, respectively, directed either toward the equatorial plane M or away from it. Similarly, the terms "radially inwardly" and "radially outwardly" refer to directions perpendicular to the axis of rotation of the tire and directed, respectively, either toward the axis of rotation or outwardly from it.

The tire 10 has at least one radial cord ply, but in many embodiments preferably will have two or more plies 16,18 as illustrated in FIG. 1. If the plies 16,18 are not comprised of cords at precisely 90°, then typically their cords would be radial as previously defined but would have oppositely inclined cord angles, that is, both positive and negative radial cord angles that typically are of about the same magnitude.

The tire 10 is of the open-torus type, the tire 10 being toroidally shaped with a circumferential opening at its inner diameter, which occurs in the rim securing regions 20,20' for the radial cords in the carcass plies 16,18. The carcass plies 16,18 are turned axially outwardly at 22,22' to follow a path on the radially inner side of annular tensile members 24,24'. The annular tensile members 24,24' are shown in cross-section in FIG. 1 as a general rectangular shape. The inner diameters of the respective annular tensile members have centers located on the axis of rotation of the tire and are formed from a material or materials selected from the group consisting of metallic filaments or one or more metal bands. The metallic filaments may be in the form of a cable or multiple turns of wire or may be formed from one or more metal bands. The bands may be multiple turns of thin steel or other suitable material or may be a band formed from cut tubing, butt welded, or the like. The annular tensile members and rim securing regions of the tire may take various forms, a number of which are illustrated in FIGS. 7-10.

Figure 8:
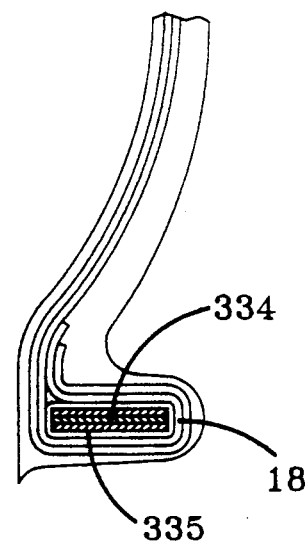

In the preferred embodiment the annular tensile members 24, 24' comprise a single bundle of flat rubber coated steel bands wrapped at least two times thus forming at least two layers as illustrated in FIG. 8.

The carcass plies 16, 18 have their respective opposite ends folded axially and radially outwardly at 22,22' as previously mentioned and the ply endings are folded about the annular tensile members 24,24', and are embedded in an elastomeric material, thereby, to form the axially-spaced-apart rim securing regions 20,20' at the circumferential opening of the open-torus tire 10. The molded rim securing regions have a shape complementary with the rim 12 at its axially spaced portions 30,30' which contact the rim securing regions 20, 20' of the tire as shown in FIG. 1.

Figure 6:
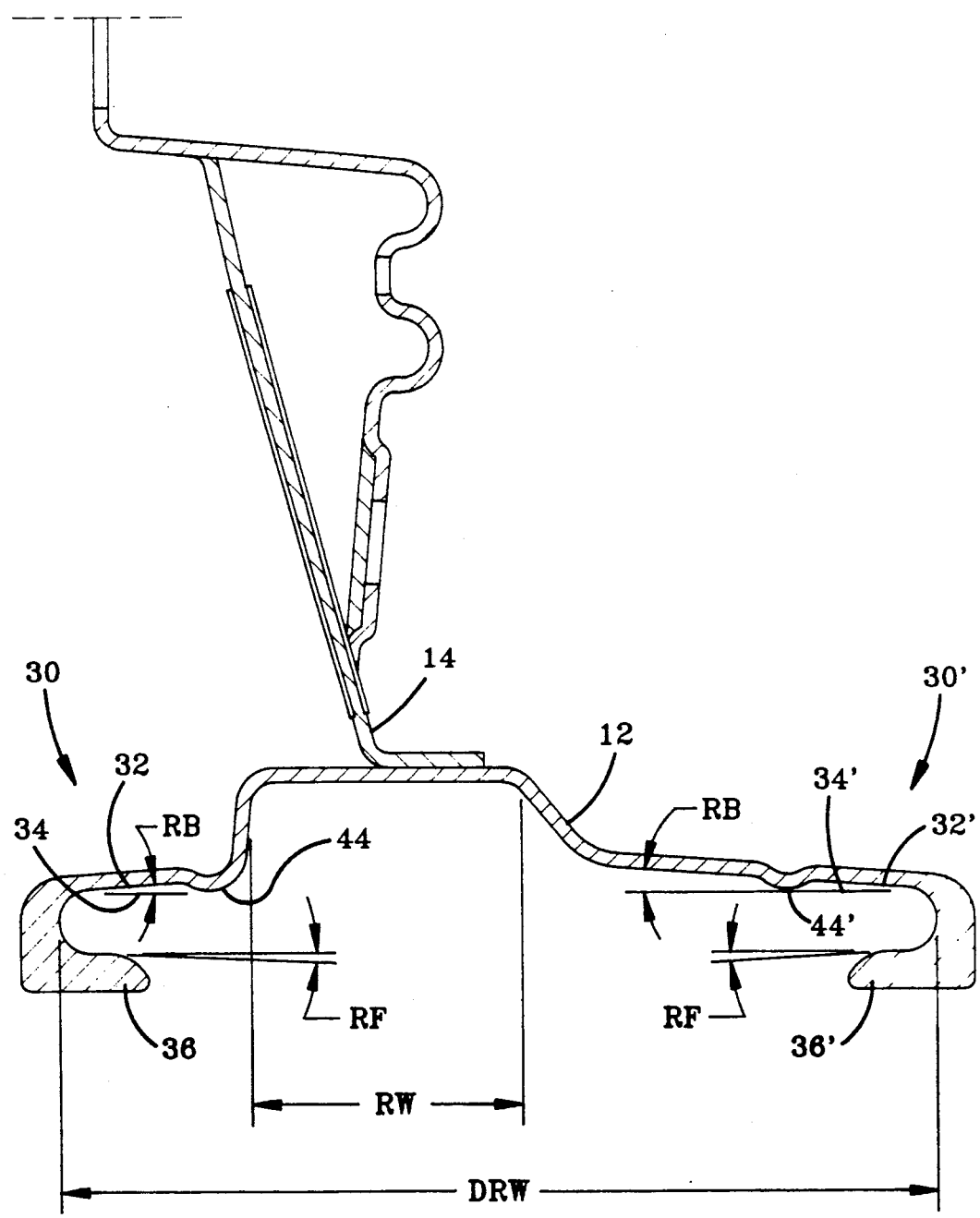
FIG. 6 illustrates the rim construction.

The rim 12 is a special rim having a design rim width DRW as shown in FIG. 6. The base 32, 32' of the rim preferably is disposed at an angle RB relative to lines 34, 34' which are parallel to the axis of rotation of the tire and rim. A curved flange 36,36' forms a means for restraining radially outward movement of the respective rim securing regions 20,20' of the tire. The restraining means contacts the exterior of the tire at its portion forming the circumferential opening on the radially inner side of its toroidal form. This restricts radially outward movement of the portions of the tire accessed by such rim restraining means. The rim securing region of the tire 20, 20' is compressed into the cavity formed by the curved flange 30, 30' and the base of the rim 32,32' by normal inflation. This results in an airtight seal and restricts movement of the tire 10 relative to the wheel 12. Of course, the provision of the annular tensile members 24, 24' enhances the radially outward restriction of the tire's rim securing regions 20,20'. The flange restraining means 36,36' preferably form an angle RF parallel to the axis of rotation of the tire and rim, and the angle RB preferably is 5°.

The rim 12 is of the drop-center type, and thus, has a central well of dimension RW that is of a width sufficient to permit both rim securing regions 20,20' of the tire to fit within it simultaneously to facilitate mounting of the tire 10 with conventional mounting equipment. Preferably, the rim 12 also has radial protrusions 44,44' to facilitate retention of the anchorage regions 20,20' between the respective rim restraining means 36,36' and the rim base 32, 32'.

Air retention within the tire 10 is achieved with an airtight seal between an inner liner 38, preferably made of a halobutyl material, effected at the respective anchorage regions 20,20' of a tire at a contact location with the rim 12 at the base of the rim 32, 32'. The liner is, of course, on the radially interior side of the carcass plies 16,18.

The tire 10 has a belt structure positioned radially outwardly of the carcass plies 16,18. The belt structure comprises at least two belt plies 46,48, which respectively have their parallel cords oriented in positive or negative directions at angles in the magnitude range from 17°-30°. The belt structure provides circumferential restriction of the inflated profile of the tire 10, such circumferential restriction of the profile being a subject of further discussion below. The tire 10 as illustrated is of a "high performance" design, and thus, is provided with a zero degree nylon overlay 50 typically found in high performance tires.

The tire 10 has a tread 52 that is positioned radially outwardly of the carcass plies 16,18 and the belt structure. The tread is oriented for rotation about the axis of rotation of the tire and, in accordance with one aspect of the invention, has a width that is related to the special rim width DRW. The width of the belt plies, however, are related to the tread width and may be used in specifying the desired relationship. For this purpose, it may be seen that the narrowest belt ply 48, having cords in the angle range from 17°-30°, crosses the equatorial plane M of the tire; its width W is less than or equal to the special rim width DRW.

The belt structure extends into the respective shoulder regions 42,42'. The respective tire sidewalls 40,40' extend between the respective rim securing regions 20,20' and the associated shoulder regions 42,42'. These sidewalls differ significantly from those of the state of the art radial-ply pneumatic tire in that there is an absence of stiffening elements adjacent the flanges 36,36' that form the restraining means of the special rim 12. Thus, the tire is very flexible at these points Pf,Pf' and radially outward along the sidewall such that the tire, when mounted on the special rim at a normal inflation pressure and placed under a normal load, has a loaded profile in its ground contact region that exhibits, in relation to the unloaded profile, primary sidewall bending adjacent the rim securing regions of the tire, that is, at the points Pf,Pf'. The precise location of these points adjacent the rim securing regions 20,20' necessarily depends upon the molded shapes of the rim securing regions and the complementary shapes and angle RF of the restraining means 36,36' of the special rim on which the inflated tire is mounted. However, the points Pf,Pf' are points of high flexibility in the respective sidewalls 40,40' and are those points which may be used to establish the beginning of the "natural cord path" of those cords in the tire's sidewall. These natural cord paths typically can be located with significant accuracy through the use of points such as those designated Ps,Ps' in the shoulders of the tire 10. These points are located midway between the stepoff in the pyramided plies 46, 48', of the belt structure and represent the locations in the respective shoulder regions 42,42' that can be used in determining the natural cord path. This path may be described as the path a cord would take if subjected to internal inflation pressure from a device such as a membrane absent restrictive stresses that might be imposed from stiff rubber materials or the like.

The cords in the plies 16,18 have a neutral line that represents the natural cord path for a cord at an angle of 90° relative to the equatorial plane. That portion of the "radial" tire cord and plies 16,18 extending between points Ps,Ps' necessarily is shorter in length than it would be were the radial cord to be circumferentially unrestricted and necessarily is not subjected to the stresses imposed on the radial cords in the sidewalls of the tire or in the circumferentially restrictive cords in the belt plies 46,48.

The "radial" cords at the locations Pf,Pf' adjacent the anchorage regions 20,20' have angular relationships to the equatorial plane M. If a line is drawn tangent to the neutral line of the "radial" plies of the tire carcass and, if such line is projected onto a true 90° or radial plane, then the angle of such line in the radial plane relative to the equatorial plane M may be determined. According to one aspect of the invention, this angle of the projected line is 45° or more relative to the equatorial plane of the tire. The projection of the line onto a radial plane is necessary to take into account a carcass ply structure involving cord angles that are other than 90° with respect to the equatorial plane at their point of intersection with it, such as occurs where the carcass plies 16,18 are at positive and negative angles of 75°.

A line tangent at point Pf to the neutral plyline the line being in a radial plane, will intersect the equatorial plane at an angle of 45° or more. The sidewall of this tire 10 has a flexible sidewall portion adjacent the rim for primary bending at location $P_f$ and a stiffer portion radially outward of the flexible sidewall portion, and a thinner cross sectional portion between the stiffer sidewall portion and the outermost edges of the belt structure.

Figure 11B:
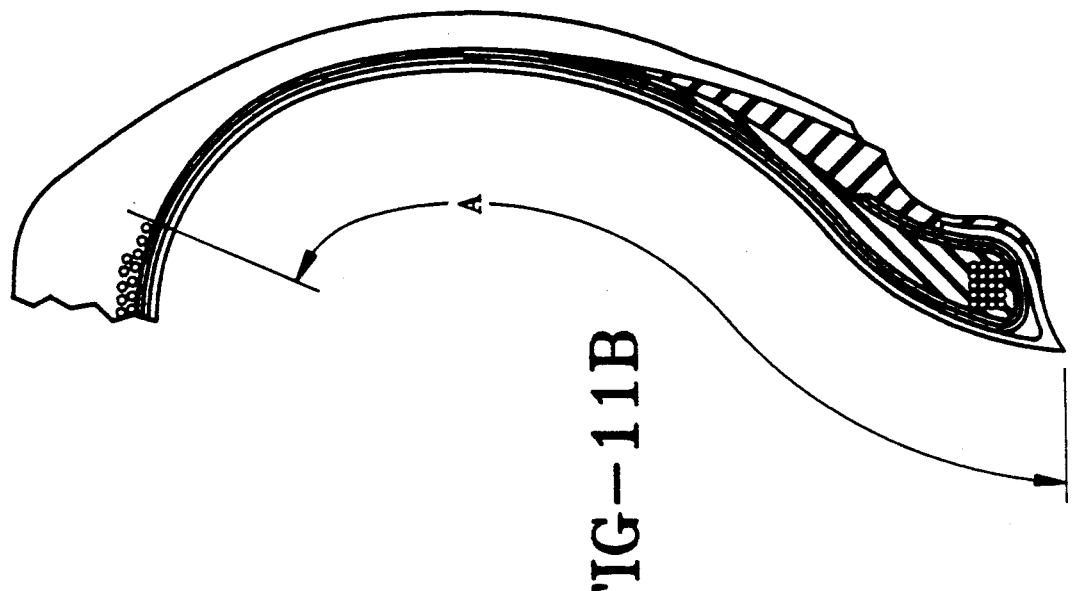
FIG. 11b illustrates the sidewall construction of a prior art tire.
Figure 11A:
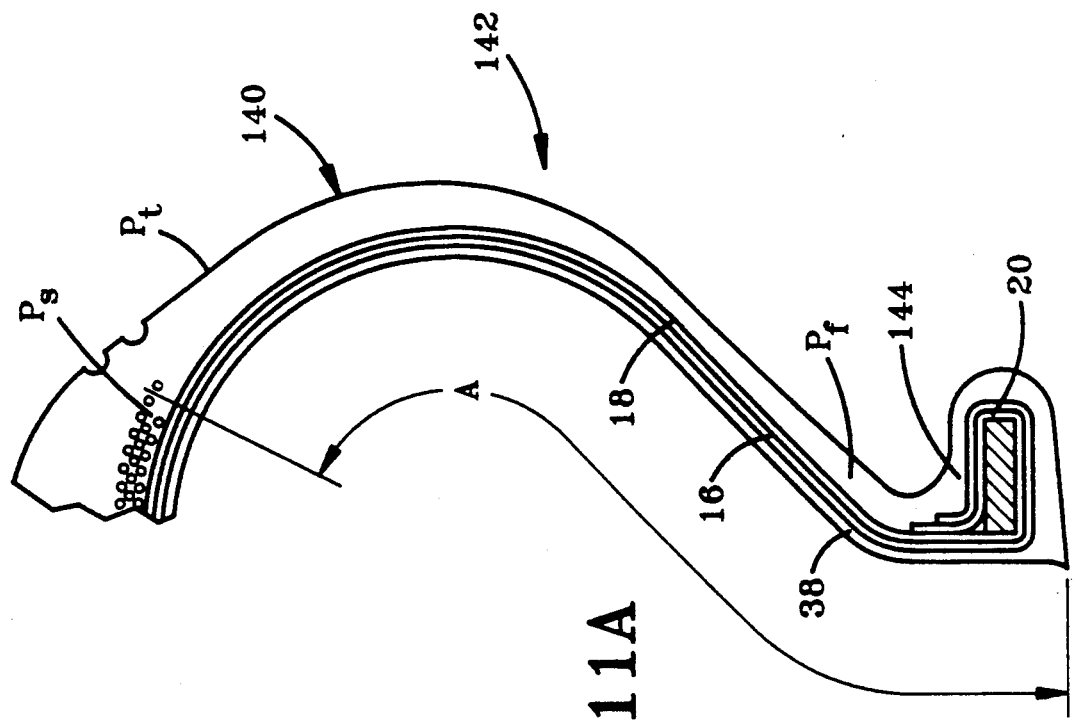
FIG. 11a illustrates a variation in a portion of a sidewall of the tire of FIG. 1.

FIG. 11a illustrates an alternative construction for the sidewall of the tire 10. This sidewall 140 extends between points Pf and Ps in the tire 10 and is thinner at both points Pf and Pt than it is over a portion 142 of its length between these spaced locations in the sidewall 140. The stiffness in the portion 144 may be achieved by the selection of rubber compounds used therein or may be used by the incorporation of a chafer (a rubber or fabric material intended to improve scuff resistance in a tire) in the location 144 of the sidewall. While it is desirable that the sidewall of the tire 10 have elastomeric material in it that does not exceed a hardness of 64 on the Shore A scale, a somewhat stiffer sidewall portion between the radially spaced points Pf and Pt can be of value particularly with respect to use of the tire in a deflated or unpressurized condition wherein the stiffened portion of the sidewall might contact the restraining means 36,36' of the rim 12. This may be better understood by reference to FIG. 13, which illustrates the profile of the tire 10 under various inflation conditions.

Figure 2:
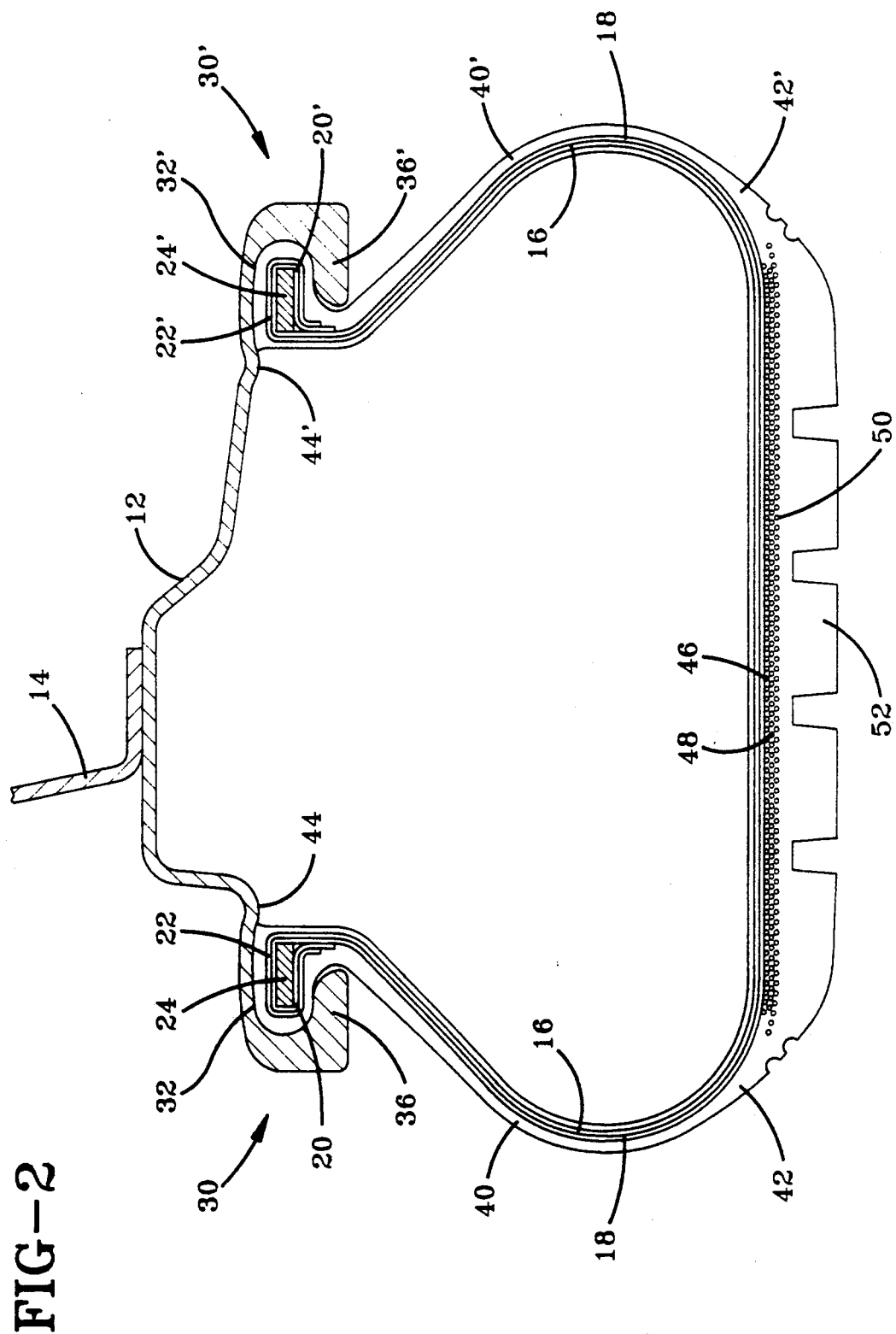
FIG. 2 is a cross-sectional view of the radial-ply tire of FIG. 1, but shows the tire profile in the center of its loaded "footprint" when the tire is at specified inflation and under normal load to indicate its loaded deflection characteristics.

FIG. 2 illustrates the tire 10 under normal inflation pressure in the center of the tire's ground contact region when under normal load. The tire illustrated is a P175/70R13 tire having a design load of Kg (893 lbs.) at an inflation pressure of 1.8 bar (26 psi).

Figure 3:
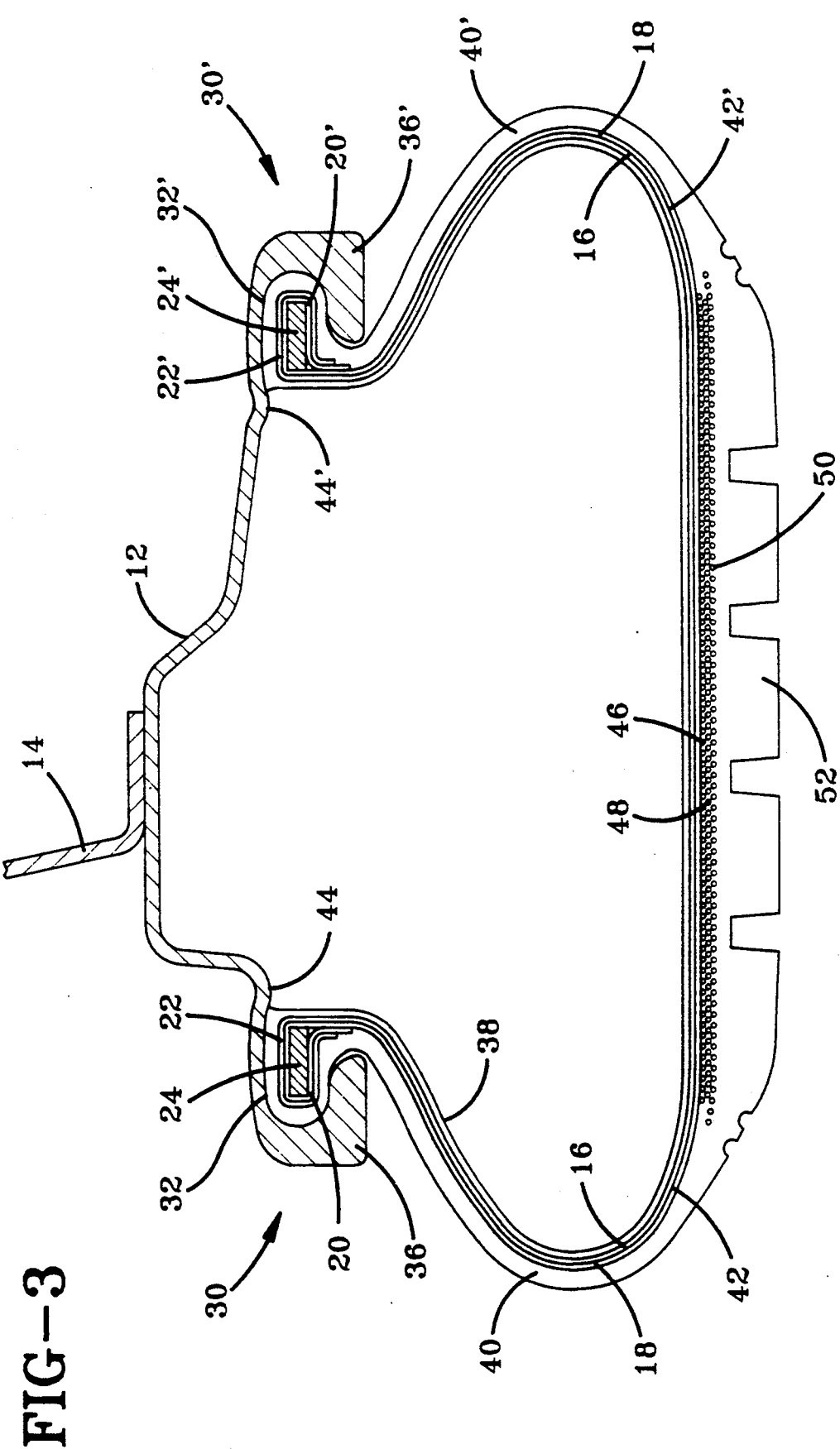
FIG. 3 is similar to FIG. 2, but is illustrative of the loaded tire profile at a reduced inflation pressure.
Figure 4:
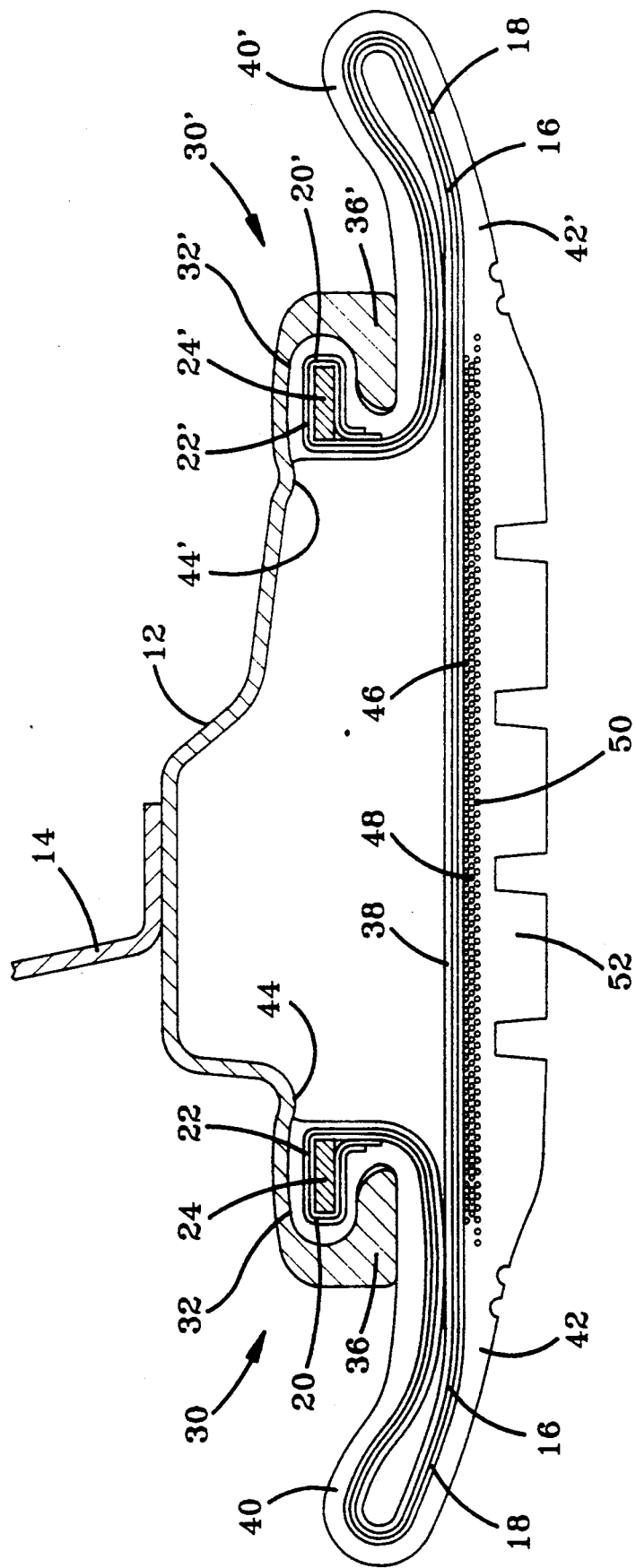
FIG. 4 is similar to FIGS. 2 and 3, but illustrates the loaded tire profile at zero inflation pressure.

In FIG. 3, the same tire with the same load is shown under identical load condition, but at an inflation pressure of 1.2 bar (17 psi). From the tire profile, it may be seen that primary bending occurs at the hinge-like points Pf,Pf' adjacent the respective anchorage regions 20,20' of the tire. This is further demonstrated in FIG. 4, which illustrates the normally loaded tire profile at an inflation pressure of 0 psi. At this inflation pressure, which is deflated, the sidewalls 40,40' of the tire contact the restraining means 36,36' of the rim 12, thereby, to provide limited run-flat capability for the tire. A lubricant preferably is provided in the tire's interior to minimize damage to the tire during run-flat operation resulting from the unequal diameters of the shoulder/undertread region of the tire in contact with the sidewall region during run-flat operation. The chafer 144 in FIG. 11a, which may include a thin veneer of a fairly hard rubber compound, may be used to limit sidewall scuffing in the region in 142 which contacts the restraining means 36 of the rim.

Figures 12, 13:
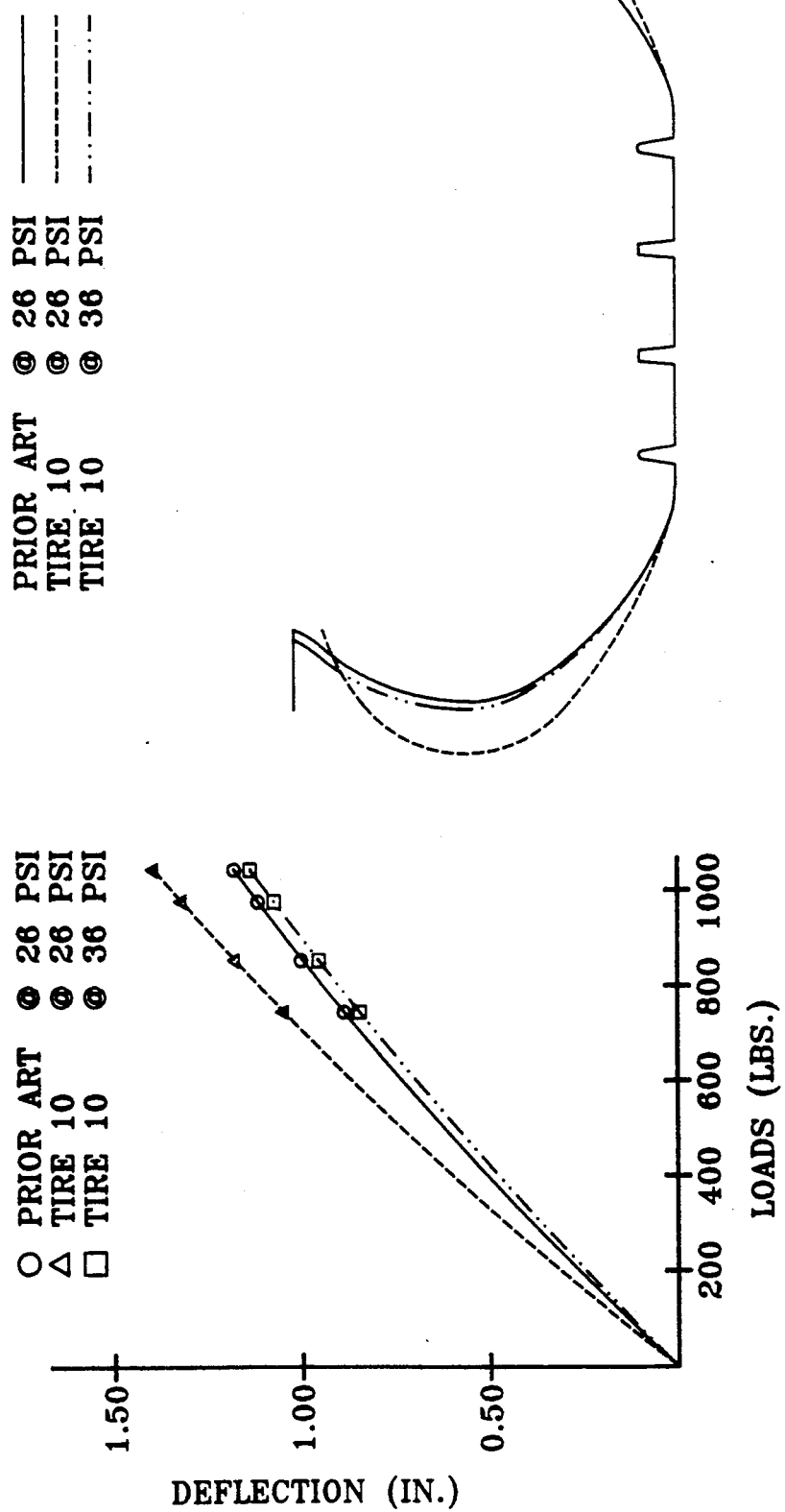
FIG. 12 is a load deflection chart illustrating the deflection versus load of the claimed tire at inflation pressures of 1.8 and 2.4 bar (26 and 35 psi) and a conventional radial tire inflated to 1.8 bar (926 psi).
FIG. 13 is a graphical representation of the normally loaded proposed tires depicted in the chart of FIG. 12.

The tire as illustrated in FIGS. 1–4 is, except for the rim securing regions 20,20' and lower sidewall areas, substantially identical in design to a tire marketed by The Goodyear Tire & Rubber Company as the "Eagle GT" speed-rated tire of size P175/70R13. This tire, the sidewall region of which is illustrated in FIG. 11b, was used as a "control tire" for evaluation of the radial-ply pneumatic tire of the invention. It may be seen that the prior art control tire has a much stiffer bead area 56 and lower sidewall area 58 than the tire of the invention, providing much different profiles under conditions similar to those depicted in FIGS. 2–4. Comparable profiles for the claimed tire and the control tire are indicated in FIGS. 13. The prior art tire profile aids in illustrating the primary sidewall bending that occurs in the tire of the invention at locations adjacent the rim securing regions of the tire 10.

FIG. 12 is a load deflection chart of the claimed tire inflated to 1.8 bar and 2.4 bar (26 psi and 35 psi) and the prior art tire art at 1.8 bar (26 psi). The chart further illustrates the relative sidewall stiffness of the tire 10 versus the prior art.

Figure 5:
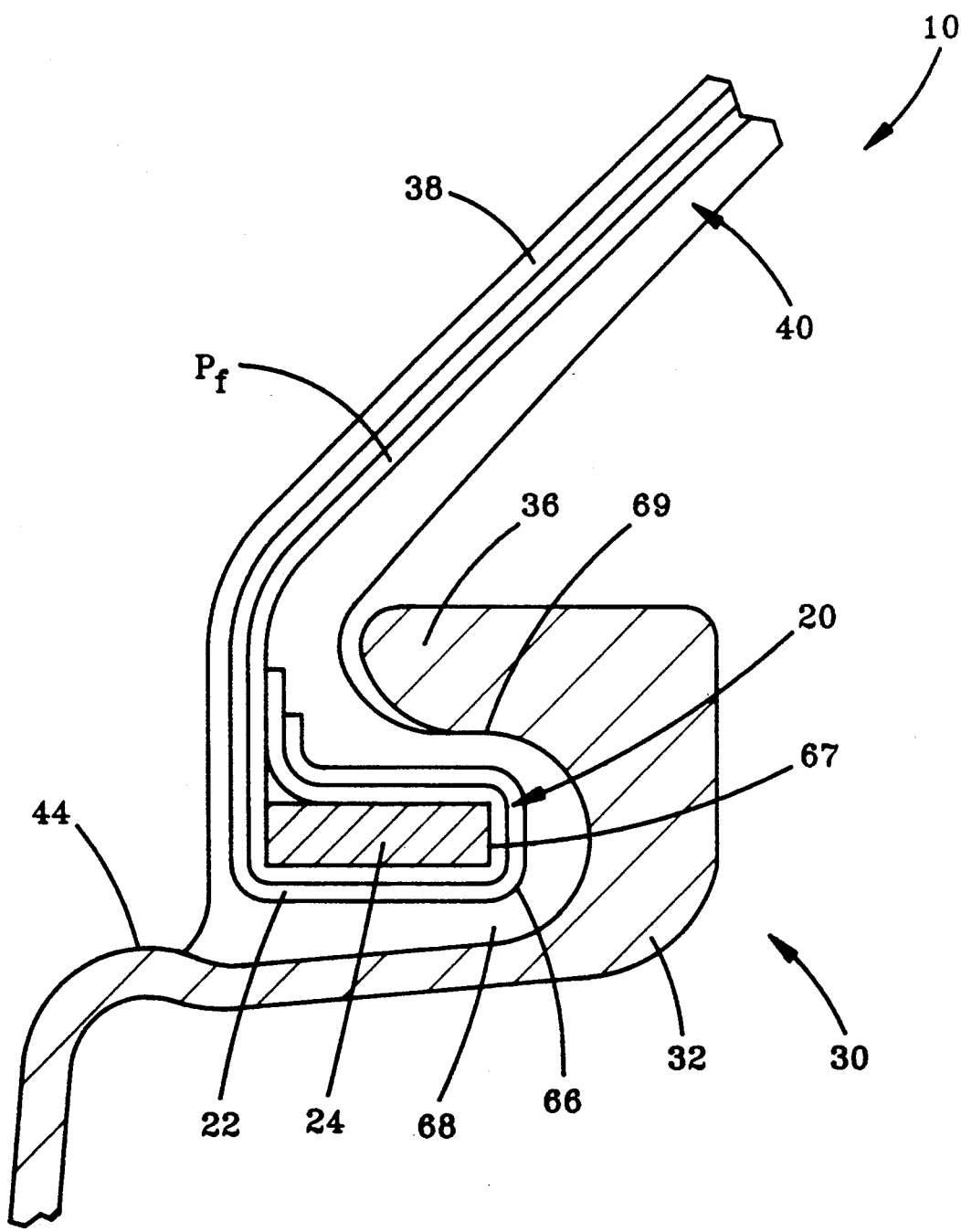
FIGS. 5 illustrates an enlarged partial cross-sectional view of a rim securing region of the tire.

FIG. 5 is an enlarged view of the rim securing region 20 and lower sidewall 40 of a tire 10 according to the present invention. The ply endings are folded 22 in the axially outward direction under the radially inner side of the annular tensile member 24. The plies can again be folded, at the axially outer end 66 of the rim securing region 20 to extend radially outwardly on the axially outer side of the annular tensile member 24, as shown at 67. The plies further can be folded at 67 of the rim securing region 20 to extend axially inwardly on the radially outer side of the annular tensile member 24 as illustrated. Elastomeric material 68 may be provided on the radially inner side of the annular tensile member. The surface of the elastomeric material 68 has an inner diameter which is less than the complementary diameter of the special rim to effect an airtight compressive seal of the inflated tire when mounted on the special rim. The molded elastomeric material on the radially outer side 69 of the rim securing region, preferably also has an interference fit with the restraining means 36 of the rim 12, but to a lesser extent than on the radially inner side of the annular tensile member 24. The rim securing region 20 of the tire occupies the rim securing means such that axially outermost surface of the securing region 20 is in contact with the rim such that the tire is axially spaced from the axially inner surface of the rim flange 36 as illustrated in FIG. 5. The angle RF (FIG. 6) of the radially outer portion of the rim securing region 20 may be selected to provide the radial restraint of the rim securing region, which restraint is provided by the restraining means 36 of the rim as previously described. The amount of interference between the molded elastomer of the rim securing region of the tire with the restraining means and base of the rim 12 must in part be determined by the force available due to tire inflation in providing seating of the rim securing region in the rim, which force is dependent in turn on the angles RF and RB in the rim.

Figure 7:
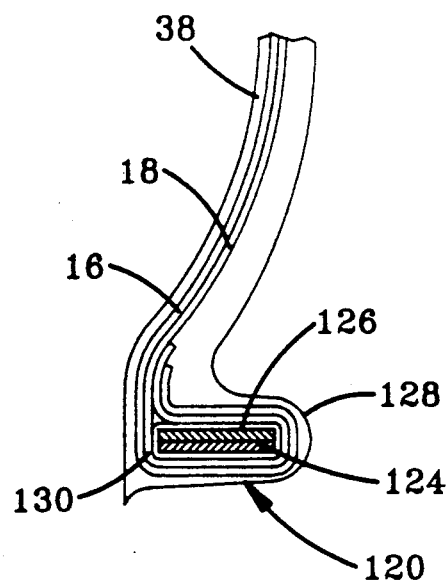
FIG. 7-10 are partial cross-sectional views of one rim securing region of the tire depicted in FIG. 1, and illustrates various configurations that may be used in the rim securing region.

FIG. 7 illustrates an annular tensile member 124 that is of uniform cross-section. This tensile member, which may be made from a steel band, which may be cut from a tube or butt welded or otherwise formed in a manner permitting it to withstand circumferential tensile stress, is covered in a layer of fabric 126. The plies 16,18 are turned about the tensile member 124, and a chafer fabric or hard rubber layer 128 may be placed about the rim securing region 120. The chafer fabric 128 is embedded in or attached to the elastomeric material of the rim securing region 20 of the tire. If the chafer material 128 is a fabric, it may be woven.

Figure 9:
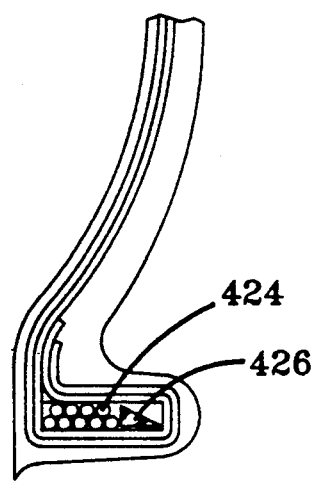
Figure 10:
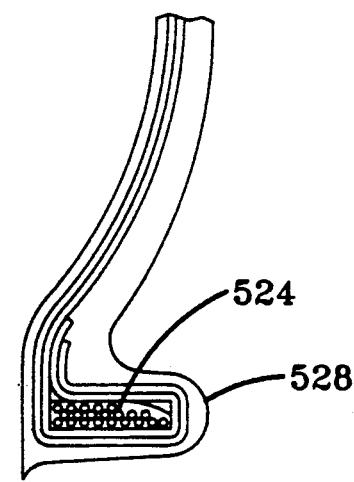

In the enlarged cross-sectional view of FIG. 8, the annular tensile member 334 comprises two or more complete continuous turns of a metal band of 0.020 inch thickness to produce a cross-section elongated in the axial direction. The enlarged cross-sectional view in FIG. 9 shows a matrix comprising a band of 8 wires in the axial direction wrapped twice yielding radial layer two wires thick. The matrix form annular tensile member 424 of uniform cross-section with an axially adjacent tapered annular elastomeric member 426 positioned radially outwardly of metal bands 424. In FIG. 10, the enlarged cross-sectional view illustrates an annular tensile member 524 that is elongated in the axial direction and that tapers in that direction as a function of distance from the tire's equatorial plane M. The taper or reduced cross-section height is achieved by variation in the number of turns of tire bead wire as the tensile member is formed from its radially inner dimension to its radially outer dimension. A chafer member 528 also is provided.

In view of the foregoing description of the invention, it will be apparent that various changes and modifications may be made in the subject matter disclosed without departure from the spirit and scope of the invention.

We claim:

1. A pneumatic tire of the open-torus type and rim assembly, the tire being configured for mounting on the rim assembly, the rim assembly including means for restraining the exterior of the tire at its portion forming the circumferential opening on the radially inner side of its toroidal form, thereby, to restrict radially outward movement of the portions of the tire accessed by such restraining means, the tire comprising:

(a) one or more radial-cord carcass plies extending between two axially spaced apart rim securing regions, the carcass plies in each rim securing region being folded axially and radially outwardly about an annular tensile member and being encased in an elastomeric material, the elastomeric material at the radially inner side of the tire being molded in a shape complementary with that of the restraining means of the rim assembly, thereby, to permit the rim restraining means to restrict radially outward movement of the rim securing regions of the tire engaged from its exterior by the restraining means of the rim;

(b) a belt structure positioned radially outwardly of the carcass plies, the belt structure having axially outermost edges and in one or more plies, cords oriented at both positive and negative angles with respect to the equatorial plane of the tire, the angles being in the magnitude range from 17°-30°, the belt structure providing circumferential restriction of the inflated tire profile;

(c) a tread positioned radially outwardly of the carcass plies and belt structure; and (d) a sidewall having a flexible sidewall portion adjacent the rim for primary sidewall bending, a stiffer portion radially outward of the flexible sidewall portion, and a thinner cross sectional portion between the stiffer sidewall portion and the outermost edges of the belt structure.

2. A radial-ply pneumatic tire according to claim 1, wherein the pneumatic tire, when normally inflated on the special rim, has the most narrow of those of its belt plies having cords in the angle range from 17°-30° and crossing the equatorial plane less than or equal in width to the special rim width.

3. A radial-ply pneumatic tire according to claim 2 wherein a sidewall of the tire is stiffer, over a portion of its length, than at spaced locations in the sidewall both closer and more removed from the sidewall's anchorage region than the stiffer portion.

4. A radial-ply pneumatic tire according to claim 3 wherein the rim securing region of the tire includes an annular tensile member, at least one carcass ply of the tire being turned about the radially inner side of the annular tensile member, and further including elastomeric material on the radially inner side of the ply or plies on the inner side of the annular tensile member, the elastomeric material having an inner diameter less than the complementary diameter of the special rim, thereby, to effect an airtight compressive seal of the inflated tire when mounted on the special rim, and further including a woven fabric embedded in the elastomeric material on the radially inner side of the annular tensile member.

5. A radial-ply pneumatic tire according to claim 3 wherein the aspect ratio of the tire is less than or equal to 0.70 and the rubber hardness in the portion of a sidewall of the tire between a shoulder and an associated anchorage region does not contain any elastomeric material, of a quantity significant to the mechanical function of the tire, having a hardness greater than 64 on the Shore A scale.

6. A radial-ply tire according to claim 1 wherein an rim securing region of the tire includes an annular tensile member that is of cross-section elongated in the axial direction of the tire.

7. A radial-ply tire according to claim 6 wherein the cross-section of the annular tensile member decreases in its radial section height as a function of distance from the equatorial plane of the tire.

8. A radial-ply tire according to claim 1 wherein the annular tensile member is formed from a material or materials selected from the group consisting of filaments and one or more metal bands.

9. A radial-ply tire according to claim 4 wherein the annular tensile member is formed from a material or materials selected from the group consisting of filaments and one or more metal bands.

10. A radial-ply tire according to claim 4 wherein the cross-section of the annular tensile member decreases in its radial section height as a function of distance from the equatorial plane of the tire.

11. A radial-ply pneumatic tire according to claim 10 wherein the amount of interference of the rim securing regions is greater at the base of the special rim than at the corresponding restraining means thereof.

* * * * *